United States Patent [19]

Satomoto

[11] 4,382,545
[45] May 10, 1983

[54] BIMETAL-ACTUATED TEMPERATURE RESPONSIVE VALVE ASSEMBLY

[76] Inventor: Atsushi Satomoto, 25-33, Chayama, Wakabayashi-Nishimachi, Toyota City, Japan

[21] Appl. No.: 225,222

[22] Filed: Jan. 15, 1981

[30] Foreign Application Priority Data

Jan. 21, 1980 [JP] Japan ................................. 55-005497
Mar. 25, 1980 [JP] Japan ................................. 55-039762

[51] Int. Cl.³ ............................................ G05D 23/10
[52] U.S. Cl. .................................... 236/48 R; 236/87; 236/101 C
[58] Field of Search .................. 236/48 R, 87, 101 C; 403/372

[56] References Cited

U.S. PATENT DOCUMENTS 4,117,976 10/1978 Doherty, Jr. ...................... 236/48 R
4,157,158 6/1979 Kitamura et al. .................. 236/48 R
4,182,485 1/1980 Kitamura ...................... 236/101 C X
4,239,152 12/1980 Kitamura et al. .................. 236/48 R
4,247,041 1/1981 Kitamura et al. ................. 236/87 X Primary Examiner—William E. Tapolcai
Attorney, Agent, or Firm—Sughrue, Mion, Zinn, Macpeak & Seas

[57] ABSTRACT

The bimetal-actuated temperature responsive valve assembly includes a body having inlet and outlet parts, a valve member for controlling communication between the inlet and outlet parts, a movable rod engageable with said valve member, a first bimetal disc engageable with the rod, a spring disposed between the body and the first disc for biasing the first disc, the rod and the valve member toward a closed position and a second bimetal disc operatively associated with the first bimetal disc for moving the first disc against the bias of the spring.

5 Claims, 5 Drawing Figures

BIMETAL-ACTUATED TEMPERATURE RESPONSIVE VALVE ASSEMBLY

BACKGROUND OF THE INVENTION

In a bimetal-actuated temperature responsive valve assembly it is preferable to limit or decrease the hysteresis relative to the temperatures at which a bimetal disc is actuated to snap overcenter with the result that the degree of movement for the stroke of the bimetal disc is limited. It is also preferable to make the valve assembly as compact as possible by reducing the diameter of the bimetal disc with the result that the degree of movement or stroke of the disc will be decreased. As a result, such conventional bimetallic disc assemblies suffer the drawback that the degree of movement or stroke is insufficient to ensure a sufficient flow even when the valve means associated with the bimetal disc is in the fully opened position.

SUMMARY OF THE INVENTION

The present invention is directed to a bimetal-actuated temperature responsive valve assembly which includes two bimetal discs, one of which is disposed in operative engagement with the valve means through a rod interposed therebetween so that upon snapping overcenter in opposite directions the valve means will be brought into open and closed positions, respectively. The other bimetal disc is operatively associated with said one bimetal disc so as to move said one bimetal disc in the opening direction of the valve means upon snapping overcenter substantially simultaneously with the snapping overcenter of said one bimetal disc in the opening direction of the valve means thereby assuring the complete opening of the valve means. By properly selecting the bimetal discs to operate sequentially, it is possible to control the flow of fluid by said valve means in steps according to the temperature, that is, the valve means will be positioned in the fully opened position at a first predetermined temperature, a partially opened position at a second predetermined temperature and in the closed position at a third predetermined temperature.

The foregoing and other objects, features and advantages of the invention will be apparent from the following more particular description of a preferred embodiment of the invention as illustrated in the acompanying drawings.

IN THE DRAWINGS

DETAILED DESCRIPTION OF THE INVENTION

Figure 1:
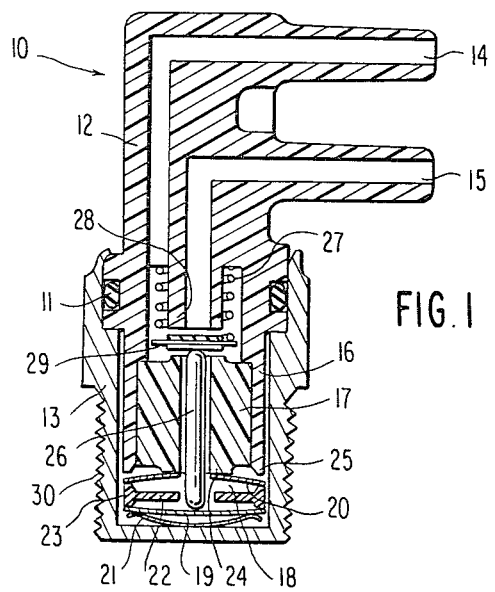
FIG. 1 is a longitudinal sectional view of a bimetal, actuated temperature responsive valve assembly according to the present invention showing a first embodiment.

The bimetal-actuated temperature responsive valve assembly 10 shown in FIG. 1 is comprised of a plastic body 12 having a portion thereof located in a cup-shaped metal body 13 and sealed therein by means of an O-ring 11. The body 12 is provided with an inlet 14 adapted to be connected to a source of negative pressure, for example the intake manifold of an internal combustion engine, and an outlet 15 adapted to be connected to an operative device such as an EGR valve so that a negative pressure will be applied to the EGR valve in accordance with the movement of the throttle valve associated with the internal combustion engine.

The body 12 is provided with a sleeve 16 extending into the cup-shaped body 13 and a separation member 17 of plastics material is secured in the lower end of the sleeve 16 to separate the fluid passage connecting the inlet 14 to the outlet 15 from the chamber 18 in the body 13 so that the bimetal discs 19 and 20 located in the chamber 18 will not be influenced by the temperature of the fluid to be controlled.

The first bimetal disc 19 is kept in position by a spring 21 while the second bimetal disc 20 is maintained in position by the outer periphery 23 of a plastic plate 22 mounted on the first bimetal disc 19. More specifically, the outer periphery of the first bimetal disc 19 is biased upwardly to abut against the lower edge of the outer periphery 23 of the plate 22 by means of the spring 21. The outer periphery of the second bimetal disc 20 is disposed in engagement with the upper edge of the outer periphery 23 of the plate 22 while the center portion thereof abuts a projection 24 on the separation member 17 as illustrated in FIG. 1. The valve member 29 is disposed in the fluid chamber between the inlet 14 and the outlet 15 for movement into and out of engagement with the valve seat 28 surrounding the outlet 15. A spring 27 normally biases the valve member 29 to the open position. A metal rod 26 is disposed in abutting engagement with the valve member 29 and the first bimetal disc 19 and extends through a passage in the member 17 with sufficient clearance to allow reciprocating movement of the rod 26.

The downward force exerted by the bimetal disc 20 on the outer periphery 23 of the plastic plate 22 in the position shown in FIG. 1 is greater than the force exerted by the spring 21 so that the first bimetal disc 19 is moved against the force of the spring 21 away from the valve seat 28 so as to ensure a full and complete separation of the valve member 29 away from the valve seat 28 thereby allowing full fluid communication between the inlet 14 and outlet 15.

The metal body 13 is screw-threaded at 30 so that the valve assembly may be threaded into the wall of a water-jacket of an internal combustion engine so that the temperature of the engine coolant in the water-jacket controls the actuation of the bimetal discs 19 and 20. When the coolant temperature is above a predetermined level, the valve 29 will be disposed in the open position as illustrated in FIG. 1 with the first bimetal disc having a downwardly convex curvature and the second bimetal disc 20 having an upwardly convex curvature.

In operation, when the coolant temperature is decreased below the determined level, the first bimetal disc 19 snaps overcenter into an upwardly convex configuration while the second bimetal disc 20 snaps overcenter to a downwardly convex configuration. The outer periphery of the second bimetal disc 20 will then engage the end 25 of the sleeve 16 thereby allowing the spring 21 to bias the first bimetal disc 19 and the plastic plate 22 upwardly. In addition to this movement, the upwardly convex configuration of the first bimetal disc 19 will move the valve member 29 into engagement with the valve seat 28 thereby isolating the outlet 15 from the inlet 14.

When the temperature increases above said predetermined level, the first bimetal disc 19 will snap overcenter thereby allowing the valve member 29 to be biased away from the valve seat 28 by means of the spring 27 thereby connecting the outlet 15 to the inlet 14 so that the EGR valve may be connected to the negative pressure source. Substantially simultaneously the second bimetal member will snap overcenter to bring the inner periphery of the second bimetal disc 20 into abutting engagement with the projection 24 while the outer periphery thereof moves from engagement with the lower end 25 of the sleeve 16 into engagement with the outer periphery 23 of the plate 22 thereby moving the plate 22 and the first bimetal disc 19 downwardly against the force of the spring 21. Thus the downward movement of the rod 26 will be increased by the downward movement of the second bimetal member to thereby increase the fluid communication between the inlet 14 and the outlet 15.

Figure 2:
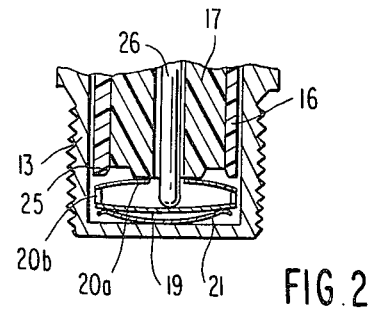
FIG. 2 is a modified sectional view of the lower portion of the assembly shown in FIG. 1 disclosing a second embodiment of the present invention.

In the embodiment shown in FIG. 2, the disc 22 has been eliminated and the second bimetal disc 20a is provided at the outer periphery thereof with a plurality of downwardly extending projections 20b which directly engage the outer periphery of the first bimetal disc 19. The operation of the valve assembly according to the second embodiment shown in FIG. 2 is substantially identical to that described above with respect to FIG. 1.

Figure 3:
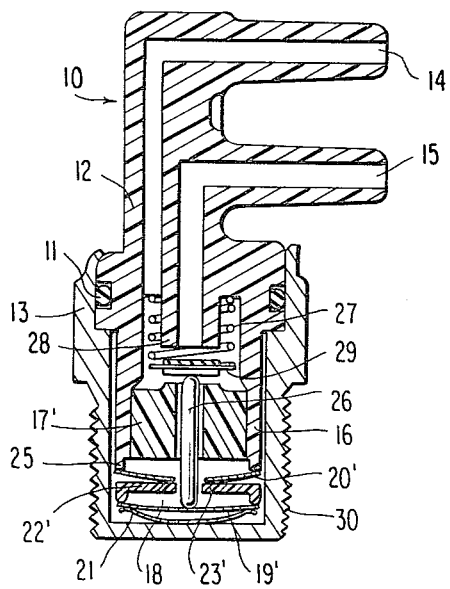
FIG. 3 is a longitudinal sectional view of a bimetal-actuated temperature responsive valve assembly showing a third embodiment of the present invention with the valve means located in the fully opened position.
Figure 4:
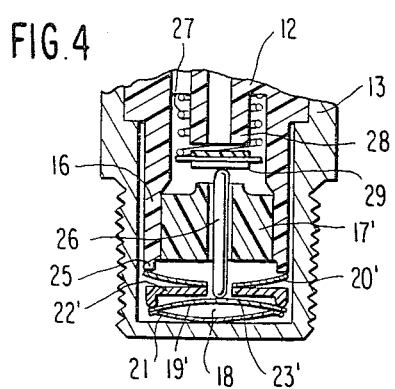
FIG. 4 is a partial sectional view of the assembly shown in FIG. 3 with the valve means in the partially opened position.
Figure 5:
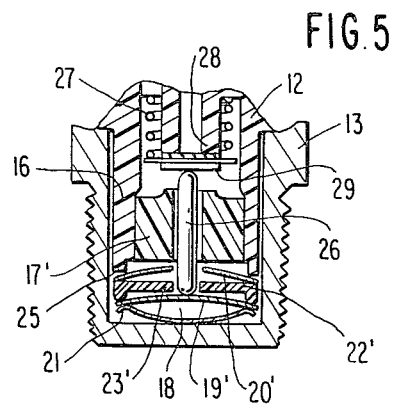
FIG. 5 is a partial sectional view similar to FIG. 3 showing the valve means in the closed position.

A third embodiment of the valve assembly according to the present invention is shown in FIGS. 3–5 wherein the snap action of the two bimetal discs is different from the snap action of the bimetal discs in the previous embodiments. The overall arrangement of the various elements illustrated in the embodiment of FIGS. 3–5 is substantially the same as that illustrated in FIG. 1 and those elements which are identical are identified by the same reference numerals. According to the embodiment shown in FIGS. 3–5, the first and second bimetal discs 19' and 20' both assume a downwardly convex configuration for the fully opened position of the valve member 29 and assume an upwardly convex configuration for the closed position of the valve member 29.

When the temperature of the coolant is at a first relatively high temperature, the valve assembly will be disposed in the condition illustrated in FIG. 3. The bimetal discs 19' and 20' are both disposed in a downwardly convex configuration with the outer periphery of the bimetal disc 20' engaging the end 25 of the sleeve 16 and the inner periphery of the bimetal disc 20' pressing downwardly on the inner periphery 23' of the spacer 22'. Thus, the downward pressing force of the bimetal disc 20' moves the spacer 22' downwardly thereby moving the first bimetal disc 19' in the downward direction against the force of the spring 21. Thus with the first bimetal disc 19' in its lowest position, the rod 26 will allow the spring 27 to move the valve member 29 to its fully opened position thereby providing the greatest degree of fluid communication between the inlet 14 and the outlet 15.

When the temperature decreases to a second intermediate value, the first bimetal disc 19' must snap overcenter to assume an upwardly convex configuration as shown in FIG. 4 while the second bimetal disc 20' is maintained in the downwardly convex configuration. Thus the valve member 29 will be moved closer to the valve seat 28 against the force of the spring 27 to thereby restrict fluid communication between the inlet 14 and the outlet 15 without shutting off communication.

When the temperature decreases further to a relatively low third predetermined value, the second bimetal disc 20 will also snap overcenter to assume an upwardly convex configuration as shown in FIG. 5. In this configuration, the inner periphery of the bimetal disc 20' is spaced from the inner periphery 23' of the spacer 22 thereby allowing the spring 21 to move the first bimetal disc 19 and the rod 26 upwardly to seat the valve member 29 on the valve seat 28 to interrupt communication between the inlet 14 and the outlet 15. In a practical example, such interruption of communication would cause the EGR valve to operate to discontinue the recirculation of exhaust gases.

While the invention has been particularly shown and described with reference to preferred embodiments thereof, it will be understood by those in the art that the foregoing and other changes in the form and details may be made therein without departing from the spirit and scope of the invention.

What is claimed is:

1. A bimetal-actuated temperature responsive valve assembly comprising body means provided with an inlet and an outlet, valve means for controlling communication between said inlet and outlet, a movable rod engageable with said valve means, a first bimetal disc engageable with said rod, spring means disposed between said body means and said first bimetal disc for biasing said first bimetal disc, said rod and said valve means in one direction for actuating said valve means, a second bimetal disc, force transmitting means between said first and second discs, said second bimetal disc being operatively interposed between said body means and said force transmitting means for moving said first bimetal disc against the bias of said spring means to thereby allow movement of said rod and valve means in the opposite direction.

2. A bimetal-actuated temperature responsive valve assembly as set forth in claim 1 wherein said force transmitting means is comprised of a disc plate having axially projecting means at the outer periphery thereof.

3. A bimetal-actuated temperature responsive valve assembly as set forth in claim 1 wherein said second bimetal disc is provided at the outer periphery thereof with axially directed projections engageable with said first bimetal disc.

4. A bimetal-actuated temperature responsive valve assembly as set forth in claim 1 wherein said first and second bimetal discs are disposed in the downwardly convex configuration at a first predetermined temperature to fully open said valve means and overcenter movement of said first bimetal disc at a second predetermined temperature to an upwardly convex configuration permits restriction of said valve means.

5. A bimetal-actuated temperature responsive valve assembly as set forth in claim 4 wherein said overcenter movement of said second bimetal disc to an upwardly convex configuration permits closure of said valve means by said spring means.

* * * * *